United States Patent [19]

Yoshida

[11] 4,439,790

[45] Mar. 27, 1984

[54] IMAGE FORMING APPARATUS

[75] Inventor: Tadashi Yoshida, Tokyo, Japan

[73] Assignee: Canon Kabushiki Kaisha, Tokyo, Japan

[21] Appl. No.: 339,282

[22] Filed: Jan. 13, 1982

[30] Foreign Application Priority Data

Jan. 23, 1981 [JP] Japan .................................. 56-8614
Feb. 16, 1981 [JP] Japan .................................. 56-21236

[51] Int. Cl.³ ............................................. H04N 1/32
[52] U.S. Cl. .................................. 358/256; 358/257; 358/293; 358/294; 358/296
[58] Field of Search ............... 358/256, 257, 293, 294, 358/287, 285, 296

[56] References Cited

U.S. PATENT DOCUMENTS

| | | | |
|---|---|---|---|
| 4,270,147 | 5/1981 | Logie | 358/257 |
| 4,287,536 | 9/1981 | Wiggins | 358/293 |
| 4,325,086 | 4/1982 | Sato | 358/296 |
| 4,353,097 | 10/1982 | Takeda | 358/257 |

FOREIGN PATENT DOCUMENTS

| | | | |
|---|---|---|---|
| 55-99875 | 7/1980 | Japan | 358/287 |
| 55-118268 | 9/1980 | Japan | 358/287 |
| 56-44262 | 4/1981 | Japan | 358/282 |

Primary Examiner—Howard Britton
Attorney, Agent, or Firm—Fitzpatrick, Cella, Harper & Scinto

[57] ABSTRACT

An image forming apparatus capable of eliminating unnecessary images other than the original image has a solid-state scanning device for reading an original and providing corresponding image information, a recording unit for recording on a recording sheet according to said image information, identifying unit for identifying the size of the original according to the output signals from said solid-state scanning device, and selector for selecting a recording sheet in said recording unit according to the identified size of the original.

18 Claims, 15 Drawing Figures

IMAGE FORMING APPARATUS

BACKGROUND OF THE INVENTION

1. Field of the Invention

The present invention relates to an image forming apparatus utilizing a solid-state scanning device for image reading.

2. Description of the Prior Art

Figure 1:
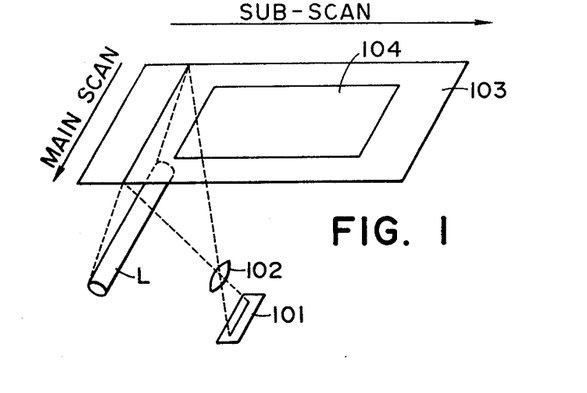
FIG. 1 is a schematic view showing an example of the conventional original reading.

In scanning an image with a solid-state scanning device such as a charge-coupled device, there is generally employed a method of effecting electronic principal scanning with the solid-state scanning device on the light reflected from an illuminated original and focused on said device, and also effecting auxiliary scanning in a direction perpendicular to the principal scanning direction. The image scanning is thus conducted over a determined scanning area. FIG. 1 shows an example of such scanning method, wherein there is shown an exposure lamp L, a solid-state scanning device 101, a lens 102, an original carriage 103 and an original image 104.

In such image reading apparatus, if the original image is smaller than the determined size or is incorrectly positioned, the obtained print contains unnecessary parts other than the desired original image or a part of the original image is not recorded on the recording sheet.

Also the recording sheet utilized for image recording is selected of a size meeting the size of the original image and is set in the recording unit by the operator. Consequently an error in the size selection leads to an inappropriate printing operation and the wasting of the recording sheet.

Such difficulties can only be avoided by the detection of the position of the original 4 or of the original area and non-original area and by the corresponding control of the printer, but such consideration has scarcely been made.

U.S. patent application Ser. No. 139,762 filed Apr. 14, 1980 now U.S. Pat. No. 4,325,086, issued Apr. 13, 1982, discloses an apparatus for detecting an end of the original placed on a carriage with a solid-state scanning device and accordingly controlling the record start position on the recording sheet, but such apparatus merely detects an end of the original document but is unable to detect the size thereof.

SUMMARY OF THE INVENTION

In consideration of the foregoing, the object of the present invention is to provide an image forming apparatus capable of eliminating unnecessary images other than the original image.

Another object of the present invention is to provide an image forming apparatus capable of detecting the size of the original and accordingly controlling the image forming process.

Still another object of the present invention is to provide an image forming apparatus capable of image formation in a determined position on the recording sheet by the detection of the position of the original image.

Still another object of the present invention is to provide an image forming apparatus capable of detecting the size and position of the original without a particular detecting element therefor.

The foregoing and still other objects of the present invention will be made fully apparent from the following description of the preferred embodiments.

DETAILED DESCRIPTION OF THE PREFERRED EMBODIMENTS

According to the present invention a solid-state scanning device is positioned, for reading an original placed on an original carriage so as to allow identification of the boundary thereof, in such a manner that the principal scanning is conducted in a direction from the outside of at least a lateral edge of the original toward the inside thereof, or plural solid-state scanning devices are so positioned along the principal scanning direction that the scanning devices at both ends perform scanning toward the center of the original, whereby said solid-state scanning device or devices determine the image position by detecting the white area of the original and measure the number of pixels outside the original image, thereby enabling to extract the information of the original image alone for printing in a determined position on the recording sheet and to determine the size and position of the original image for selecting the recording shet of a size matching thus detected size.

Now the present invention will be clarified in detail by the following description to be taken in conjunction with the attached drawings.

Figure 2:
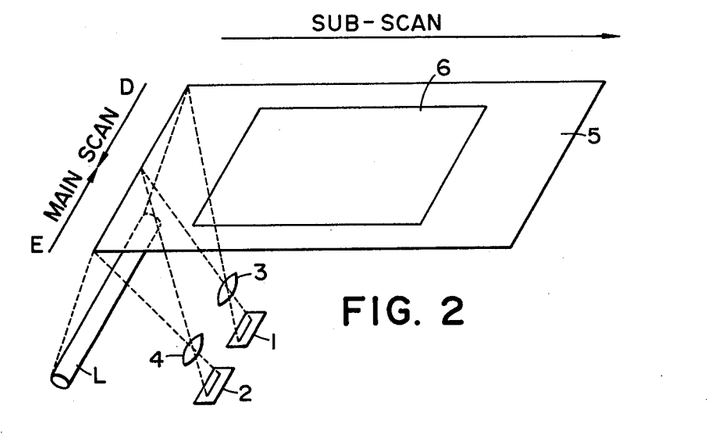
FIG. 2 is a schematic view showing an image reading embodying the present invention.

FIG. 2 shows an embodiment of the present invention utilizing two solid-state scanning devices, wherein represented are an exposure lamp L, solid-state scanning devices 1, 2, lenses 3, 4, an original carriage 5 and an original 6 placed on said original carriage. Said solid-state scanning devices 1, 2 are so positioned that they perform scanning respectively in directions D, E, namely toward the center. The scanning of said original is conducted with a black cover placed on said original, or without any cover, so that the light from the exposure lamp L is solely reflected inside the boundary of the original. Consequently the area outside said original is identified by a black level signal, and the position of the original on the carriage 5 can be determined by the identification of the background color of the original, for example by a white level signal.

Figure 3:
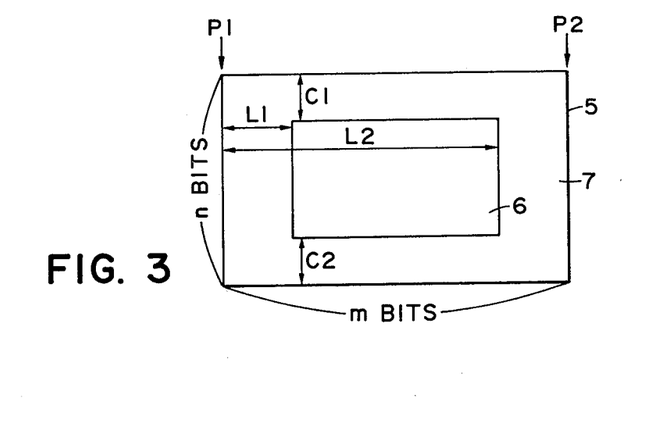
FIG. 3 is a schematic view showing the process for detecting the position and size of the original according to the present invention.

FIG. 3 shows the process of detecting the position of the original, wherein 5 indicates the original carriage, 6 the original, and 7 an area outside said original. The auxiliary scanning starts at a point P1 and ends at a point P2. The number of pixels (n bits) in the principal scanning and that (m bits) in the auxiliary scanning are assumed as already known. Starting the scanning operation from the point P1, the solid-state scanning devices 1, 2 provide black-level signals until they reach the original. In this manner the solid-state scanning device 1 detects the number of pixels L1 in the auxiliary scanning direction, i.e. the number of scanning lines, and the number of pixels C1 in the principal scanning direction encountered until the first detection of the white level signal by said scanning device 1. Also the solid-state scanning device 2 detects the number of pixels C2 encountered in the principal scanning direction until the first detection of the white level signal by said scanning device 2. Similarly detected is the number of pixels L2 until the end of the original image. The image information read in the scanning is stored in an image memory, and it is possible to extract the information of the original image alone by suitable addressing of said image memory according to the above-mentioned numbers C1, C2, L1 and L2 in the information readout from said memory for data printout.

Also said detected numbers C1, C2, L1 and L2 are utilized for determining the size of the original image, of which the longer and shorter edges are determined as $L2-L1$ bits and $n-(C1+C2)$ bits, respectively. A suitable recording sheet can be selected by comparing thus determined size with the bit numbers representing several sizes of the available recording sheets.

The present invention will now be explained in further detail by an embodiment thereof shown in FIGS. 4 and 5.

Figure 4:
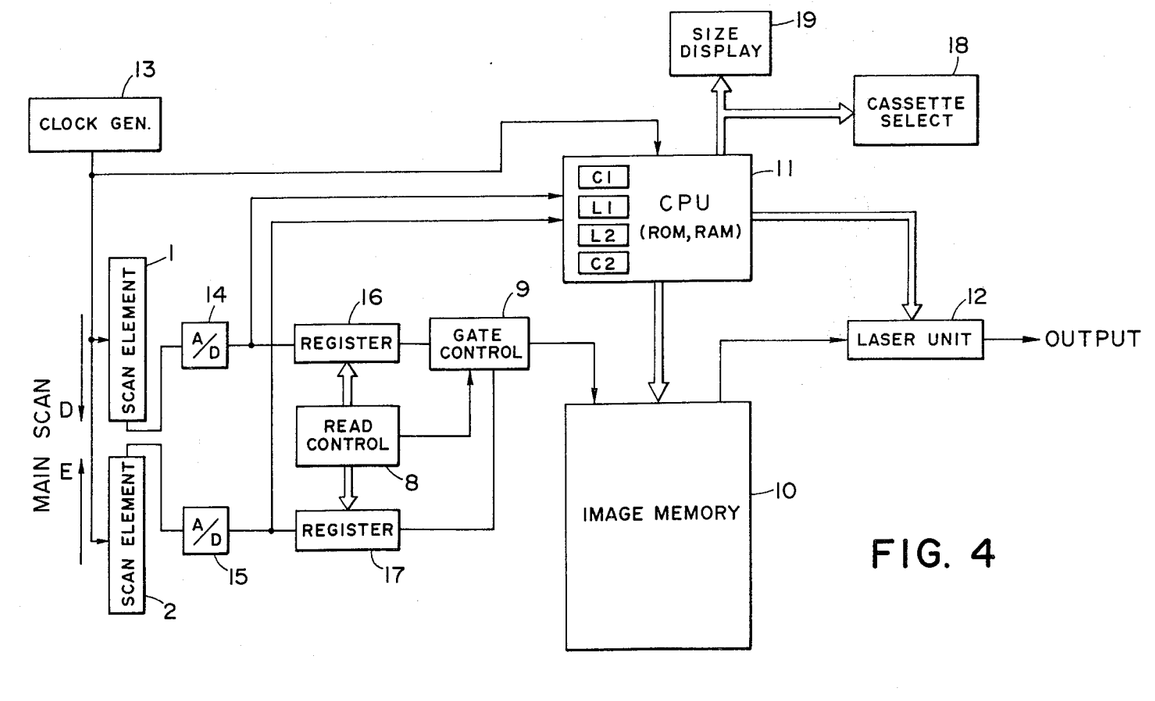
FIG. 4 is a block diagram of a circuit embodying the present invention.

FIG. 4 is a block diagram of the circuit embodying the present invention, wherein shown are solid-state scanning devices 1, 2 such as charge-coupled devices performing the principal scanning respectively in the directions D and E; a clock pulse generator 13 for supplying clock pulses to said solid-state scanning devices 1, 2 and to a counter in a central processing unit (CPU) 11 composed of a known microcomputer; analog-to-digital converters 14, 15; registers 16, 17 for temporarily storing the image information; a readout control unit 8 for reading signals from said registers 16, 17; a gate control unit 9 for converting the data dividedly stored in said registers 16, 17 into serial image information of a scanning line; an image memory 10 capable of storing image information for the entire scanning area; a central processing unit (CPU) 11 having a read-only memory (ROM) and a random access memory (RAM) and capable of counting and memorizing the aforementioned numbers C1, C2, L1, L2 indicating the position of the original image and further capable of addressing the image memory 10; counters C1, C2 of a capacity of at least n/2 bits; counters L1, L2 of a capacity of at least m bits; and a laser unit 12 for printing the data stored in said image memory 10 onto a recording sheet. The image information read by the successive or simultaneous scanning function of the solid-state scanning devices 1, 2 is transferred in synchronization with the clock pulses supplied from the clock pulse generator 13, converted into digital signals by the A/D converters 14, 15 and stored in the registers 16, 17. At the same time the CPU 11 counts the aforementioned numbers C1, C2, L1 and L2 representing the position of the original image in the manner as already explained in relation to FIG. 3. The readout control 8 controls the registers 16, 17 in such a manner that the data stored in the register 17 are read in the inverse order while the data stored in the register 16 are read in the same order as in the data storage. Thus the data stored in said registers 16, 17 are read as serial image information corresponding to a scanning line according the switching function of the gate control 9 and are serially stored in the image memory 10.

Figure 5:
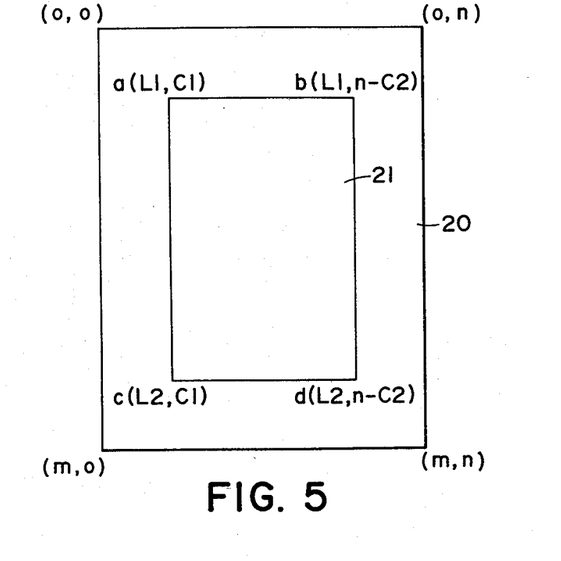
FIG. 5 is an address map of an image memory shown in FIG. 4.

FIG. 5 shows the address map of the image memory shown in FIG. 4. In FIG. 5 there are shown the image memory 20 having addresses from (0, 0) to (m, n), and an original image 21 stored in said image memory and defined four coordinates a, b, c and d. Thus the CPU 11 can address the memory in such a manner as to supply the data of the original image alone to the laser unit 12 of the printer. When the printer performs scanning in a direction along the longer edge or shorter edge, the data stored in said image memory 10 are read respectively in the order from (L1, C1) to (L2, C1) or from (L1, C1) to (L1, n−C2), thereby obtaining the information of the original image alone from the image memory 10 and avoiding other unnecessary data.

Also the CPU 11 calculates the size of the original image as $(L2-L1, n-(C1+C2))$ from the aforementioned numbers C1, C2, L1 and L2 indicating the position of the original image, compares thus determined size with the several sizes of the recording sheets and accordingly drives a cassette selector 18 for selecting a suitable recording sheet. Furthermore the CPU 11 performs the aforementioned readout control for supplying the data to the laser unit 12 in such a manner that the original image alone is appropriately recorded on thus selected recording sheet. Such recording can be achieved by reading the data from the image memory in the order from (L1, C1) to (L2, C1) or from (L1, C1) to (L1, n−C2) respectively when the printer performs scanning in a direction along the longer edge or shorter edge.

A signal obtained corresponding to the selected size can be utilized for displaying said size on a keyboard or in a size indicator 19, or as an instruction signal for activating one of plural cassettes mounted on the apparatus.

In this manner the present invention allows to prevent the erroneous recording explained in the foregoing.

In addition to the foregoing embodiment utilizing two solid-state scanning elements, the present invention is similarly applicable to a reading apparatus utilizing three or more scanning devices.

Figure 6:
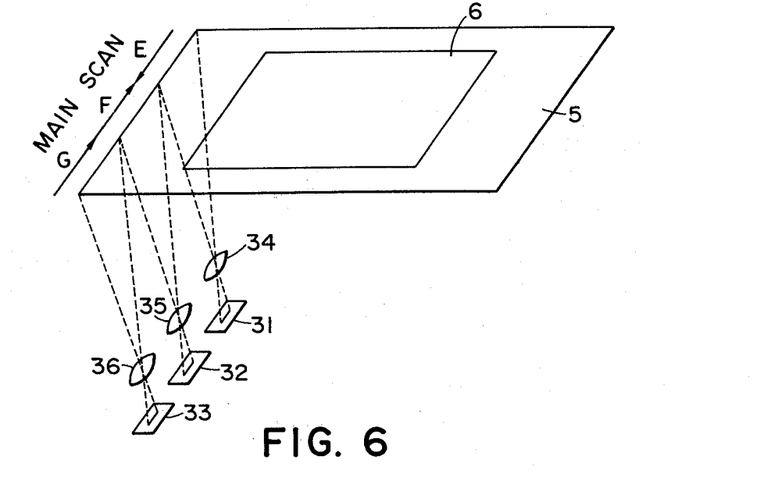
FIG. 6 is a schematic view showing an image reading with three solid-state scanning devices.

FIG. 6 shows such an embodiment employing three solid-state scanning devices, wherein illustrated are solid-state scanning devices 31, 32, 33; lenses 34, 35, 36; an original carriage 5; and an original 6 placed on said carriage 5. In this embodiment two scanning devices positioned at both ends perform scanning function toward the center. For example the device 31 alone performs the scanning in a direction E while other devices 32, 33 perform the scanning in directions F and G. In this case the device 32 is utilized for detecting the end position of the original image if it is not detected by the device 33.

Figure 7:
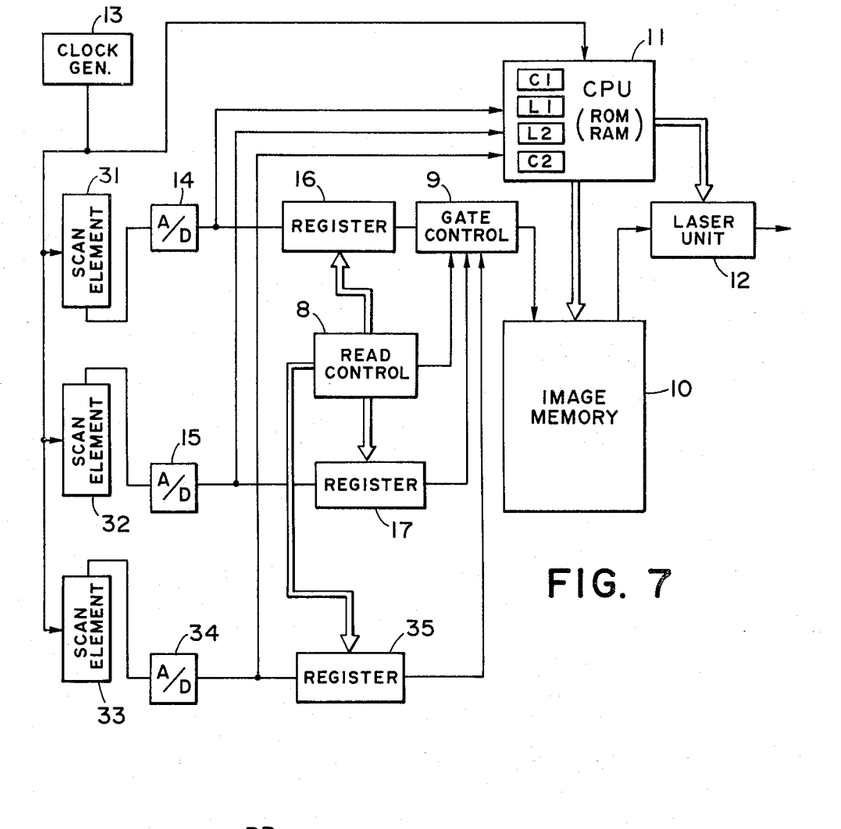
FIG. 7 is a block diagram to be employed in the image reading shown in FIG. 6.

FIG. 7 shows a block diagram of the circuit to be employed in the embodiment shown in FIG. 6, wherein the same components as those in FIG. 4 are represented by same numbers, the numbers of various blocks correspond to those shown in FIG. 6. Also there are provided an A/D converter 34 and a register 35 corresponding to the solid-state scanning device 33. Similarly it is also possible to use four or more solid-state scanning devices, in which case the principal canning directins thereof are suitably determined according to the frequency of the original sizes encountered.

Figure 8:
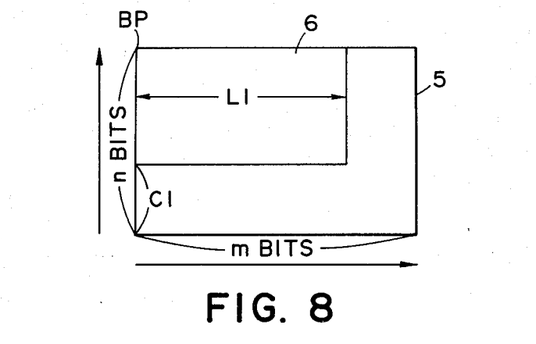
FIG. 8 is a schematic view showing an image reading with one solid-state scanning device.

Also FIG. 8 shows an embodiment employing a solid-state scanning device, in which case a corner of the original 6 is placed on a reference point BP on the original carriage 5.

Figure 9:
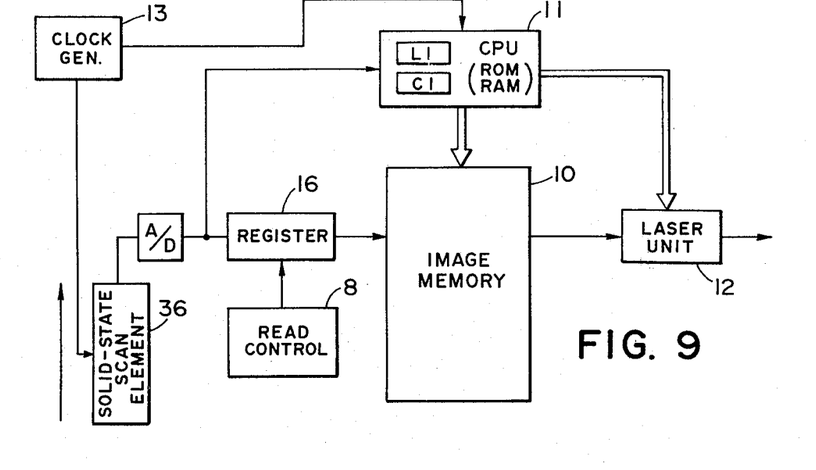
FIG. 9 is a block diagram to be employed in the image reading shown in FIG. 8.

In this embodiment the size of the original image as L1 for the longer edge and (n−C1) for the shorter edge by a solid-state scanning device 36, and the corresponding control circuit is represented by the block diagram shown in FIG. 9, in which the same components as those in FIG. 4 are represented by same numbers.

In an original reading device of the present invention in which the original is maintained in position by an original cover, the color thereof is not necessarily limited to black but can be of any other color that will provide a discontinuity in the detection signal at the boundary between said original cover and the original with white background.

As explained in the foregoing, the present invention allows to extract the image information of the original alone by the detection of the position and size of the original placed on the original carriage, thereby avoiding the recording of unnecessary area other than said information or the inappropriate positioning of the information recording on the recording sheet.

In addition the present invention allows to detect the size of the original placed on said original carriage and accordingly select the recording sheet of a suitable size or inform the operator of such size.

Figure 10:
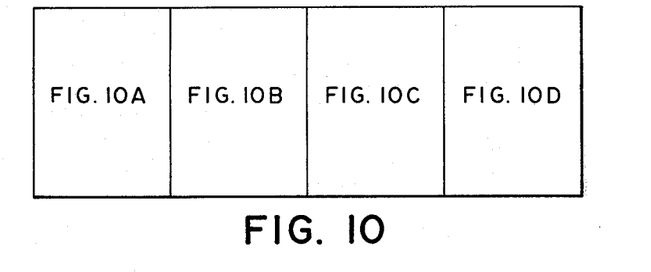
FIG. 10, consisting of FIGS. 10A, 10B, 10C, 10D; and 11 are flow charts showing the control function of the control unit.
Figure 10A:
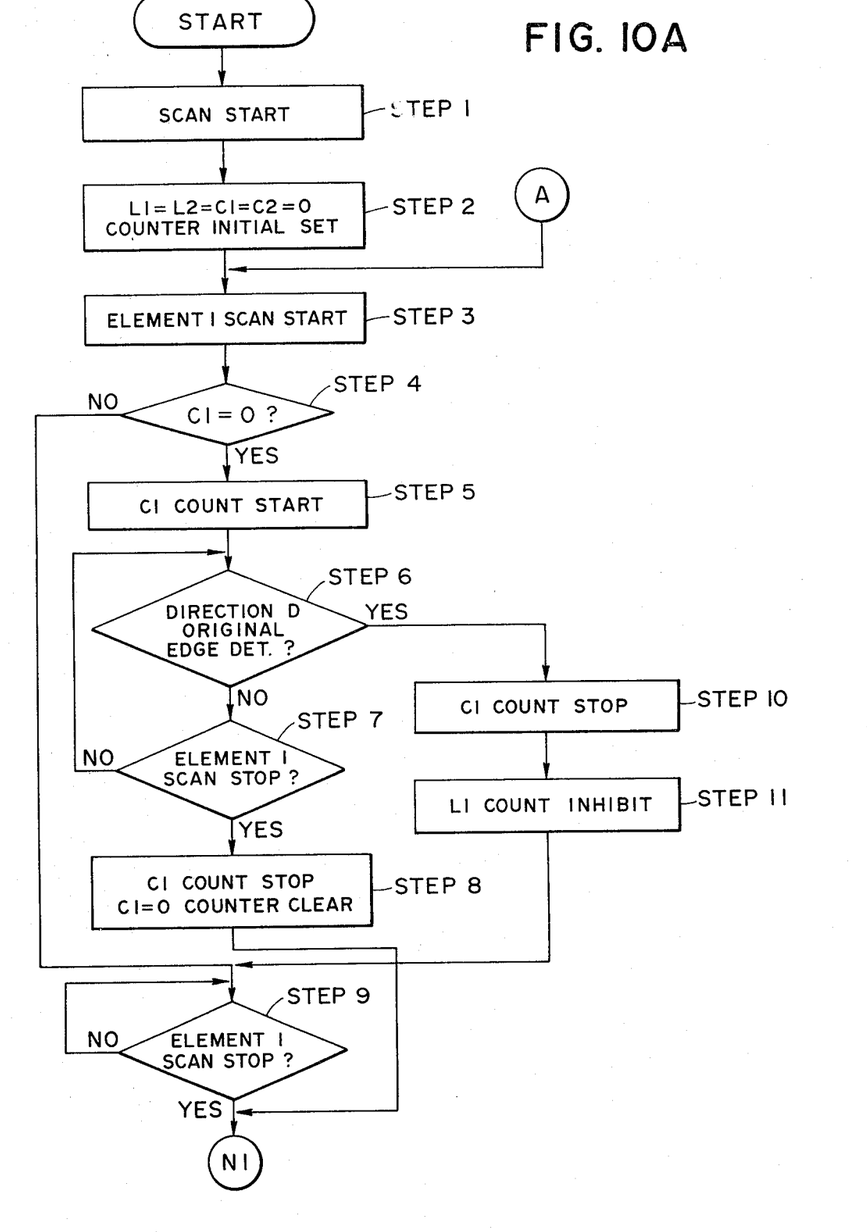
Figure 10B:
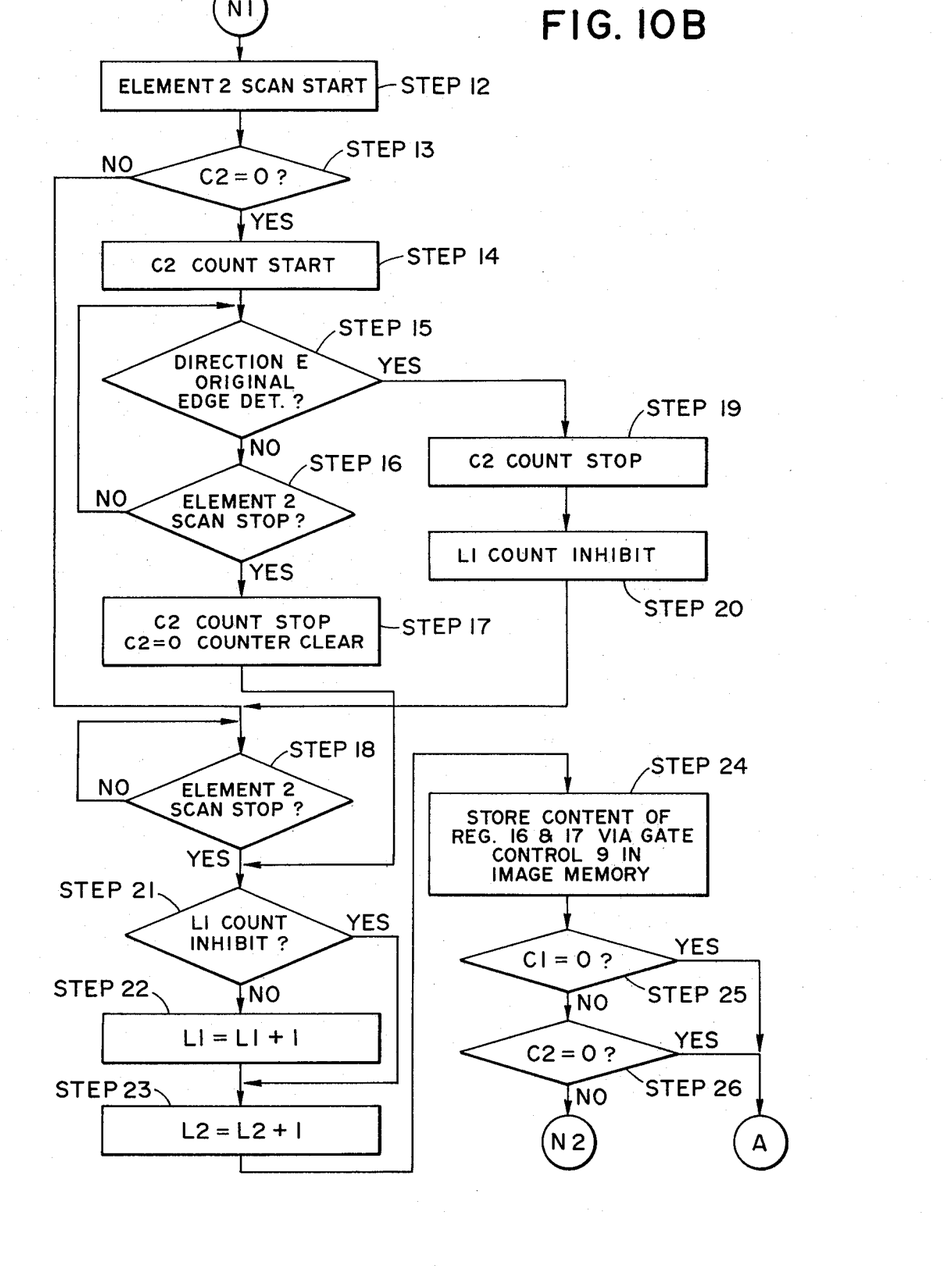
Figure 10C:
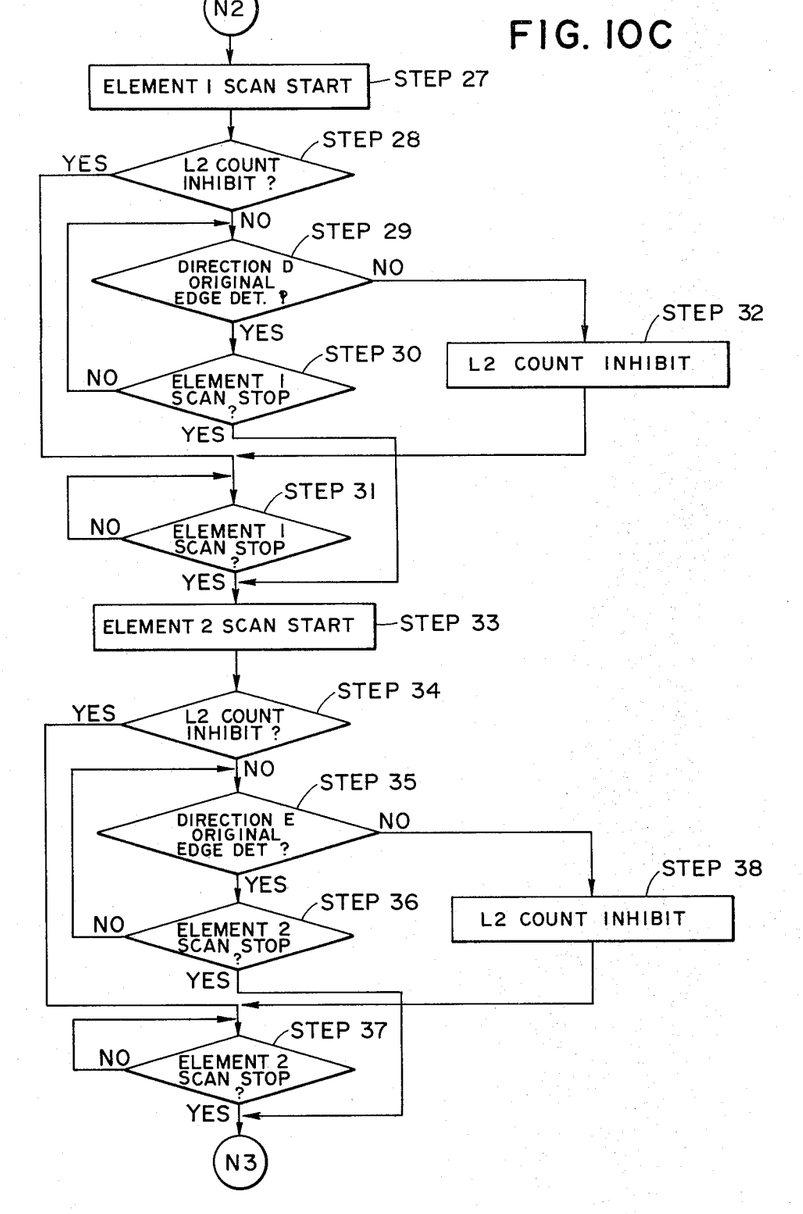
Figure 10D:
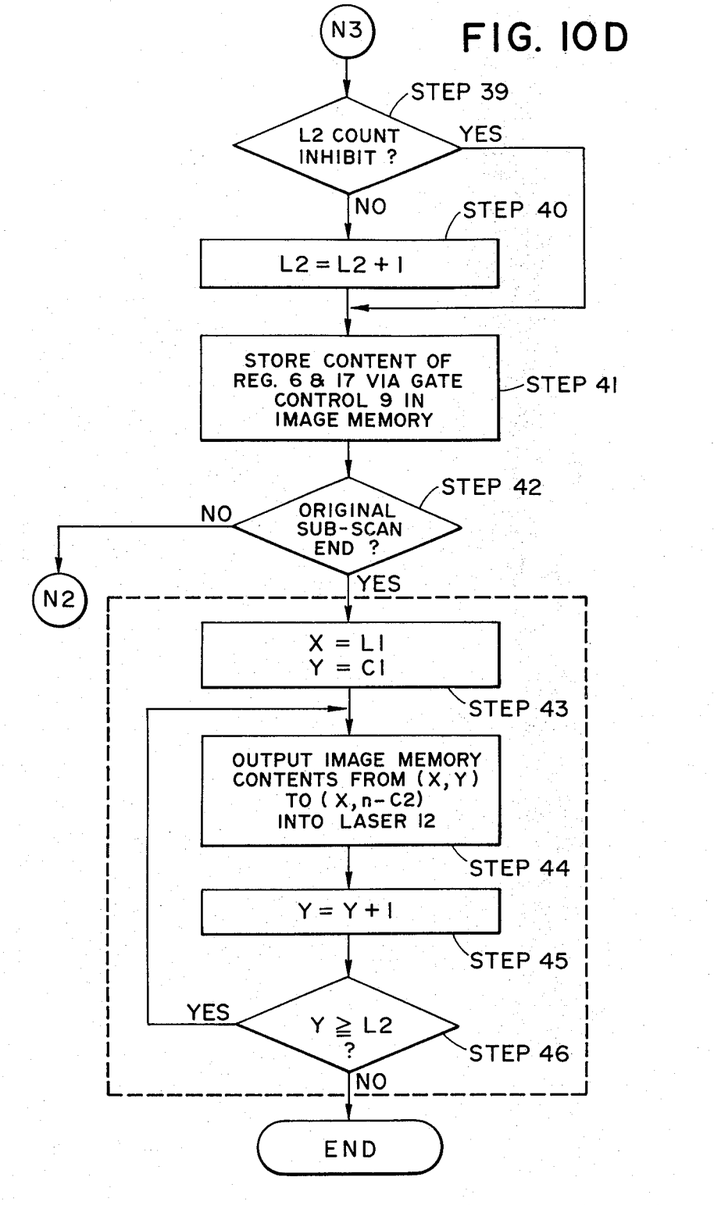

Now reference is made to FIGS. 10A and 10B showing the control flow chart of the CPU 11 in the embodiment shown in FIG. 4, and the control sequence will be explained in the following.

Step 1 initiates the scanning function of the original image, then Step 2 initializes the counters C1, C2, L1 and L2 to zero, and Step 3 initiates the scanning function of the scanning device 1. Steps 4 to 9 serve to detect the edge position of the original in the principal scanning directin D shown in FIG. 4, and the counter C1 is stopped to store the count upon said detection, or is cleared if said edge position is not detected. Step 4 identifies if said edge position is already detected, and, if so, the program waits in Step 9 until the completion of the scanning function of the scanning device 1 and proceeds to the succeeding step. On the other hand if the edge position is not yet detected, the program continues said detection in the Steps 6 and 7 until completion of the scanning function of the scanning device 1. Upon detection of the edge position during said procedure, the counters C1 and L1 are stopped to determine the point (L1, C1) shown in FIG. 3, and the program waits in Step 9 until the completion of the scanning function of said device 1 and proceeds to the succeeding Step 12. On the other hand if the edge position is not detected until the completion of the scanning function of the device 1, the counter C1 is stopped and cleared, and the program proceeds to Step 12.

Then Step 12 initiates the scanning function of the scanning device 2, and Steps 13 to 18 serve to detect the edge position of the original in the direction E in a similar manner as in the scanning device 2. Upon detection of said edge position the counter C2 is stopped to retain the count. Also the count in the auxiliary scanning direction is taken as the number L1 at the first detection of the edge position in the direction D or E. The scanning function of a line is thus completed in Steps 13 to 18. If Step 21 identifies that the counting function of the counter L1 is already inhibited indicating that the edge position is already detected in the direction D or E, the counter L1 is no longer advanced stepwise, and the count of the counter L2 is stepwise increased in Step 23. At this point the data of a scanning line read by the scanning devices 1 and 2 are respectively stored in the registers 16 and 17 shown in FIG. 4. Step 24 causes the readout control 8 to control the registers 16, 17 and the gate control, thus storing the image data representing a line into the image memory 10. The succeeding Step 25 and 26 identify if the edge positions of the original are detected in the directions D and E, and if said edge position is not detected at least in one of said directions D and E, the program returns to the point (A) for repeating Steps 3 to 24. On the other hand if said edge positions are detected in both directions the program proceeds to Steps 27 to 37 constituting a routine for determining the end positions of the original represented by the points c and d shown in FIG. 5. Steps 28 to 31 identify the end position of the original when the edge position in the direction D is no longer detected. Step 28 identifies if the counting function of the counter L2 is already inhibited in Step 32 indicating that the edge position is already detected in the direction D, and, if so, the program waits in Step 31 until the completion of the scanning function of the scanning device 1 and proceeds to the succeeding Step 33. On the other hand if the counting function of the counter L2 is not yet inhibited in Step 28, Steps 29 and 30 are executed to continue the detection of said edge position until the completion of the scanning function of the scanning device 1. Then the program inhibit the counting function of the counter L2 in Step 32 and proceeds to Step 31 if said edge position becomes no longer detected in Steps 29 and 30, or proceeds to Step 33 if said edge position is not detected in Steps 29 and 30.

Steps 34 to 37 serve to repeat a similar procedure with the scanning device 2 in the direction E. Stepwise increment of the counter L2 no longer takes place in Step 40 if Step 39 identifies that the end position of the original is already detected in the direction D or E. The scanning function of a line is completed at this point, and the succeeding Step 41 executes the storage of the image data in the image memory 10 in a similar manner as in Step 24. Step 42 causes to the repeat of Steps 27 to 42 until the entire original is scanned, whereby the image data obtained by the scanning of the entire original are stored in the image memory 10. The numbers C1, L1, C2 and L2 are thus obtained in the above-mentioned routine and utilized for determining the four address points a(L1, C1), b(L, n−C2), c(L2, C1) and d(L2, n−C2) shown in FIG. 5.

Steps 43 to 46 surrounded by a broken line constitute a routine for addressing the image memory 10 for signal supply to the printer through the laser unit 12. At first Step 43 assumes a condition (X, Y)=(L1, C1) to initiate the data readout from point a shown in FIG. 5. The data readout from point a(L1, C1) to point b(L1, n−C2) is executed in Step 44. The succeeding Step 45 executes the increment Y=Y+1 for signal readout from (L1+1, C1) to (L1+1, n−C2). If the image end is not reached in Step 46, Steps 44, 45 are repeated until the data from point c to point d are released, thus completing the image data output.

Figure 11:
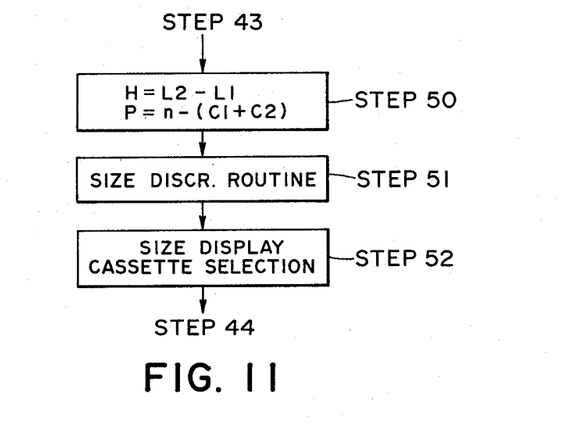

A size identifying routine shown in FIG. 11 can be added after said Step 43 to record the data stored in the memory 10 on a recording sheet of an appropriate size meeting the size of the original. In said routine, Step 50 calculates $H=L2-L1$ and $P=n-(C1+C2)$ from the aforementioned numbers C1, C2, L1 and L2 to determine the lateral size H and the longitudinal size P of the original. Then Step 51 identifies the size of the original from said values H and P by means of a size identifying routine, and the succeeding Step 52 executes the display of the size and the selection of a cassette containing appropriate recording sheets according to the result of said identification.

The sequence control function of the CPU shown in FIGS. 7 and 9 is omitted from the explanation as it is similar to the function of the CPU shown in FIG. 4 and will be readily understandable by those skilled in the art.

What I claim is:

1. An image forming apparatus, comprising:
   means for reading an original and providing corresponding image information;
   a recording unit for recording an image on a recording sheet according to the image information provided from said reading means;
   identifying means for identifying the size of the original according to the output signals from said reading means; and
   selecting means for selecting a recording sheet size in said recording unit according to the identified size of the original.

2. An image forming apparatus according to claim 1, wherein said identifying means is adapted to identify the size of the original by detecting plural lateral edges of the original from the output signals of said reading means.

3. An image forming apparatus according to claim 1, further comprising a display unit for displaying the result of said identification by said identifying means.

4. An image forming apparatus, comprising:
   plural solid-state scanning devices for reading an orignal, wherein at least one of said scanning devices has a scanning direction different from that of the remaining scanning devices;
   a memory for storing image information supplied from said plural solid-state scanning devices;
   detecting means for detecting image areas positioned around the original from the output signals of said plural solid-state scanning devices; and
   control means for controlling said memory in response to the signals from said detecting means.

5. An image forming apparatus according to claim 4, wherein said control means is adapted to address said memory in response to the result of detection by said detecting means.

6. An image forming apparatus according to claim 4, wherein said detecting means is adapted to detect the number of pixels outside the original in the scanning direction of said solid-state scanning devices and in a direction perpendicular to the scanning direction.

7. An image forming apparatus according to claim 4, wherein the storage of the image information in said memory is conducted simultaneously with the detecting function of said detecting means.

8. An image forming apparatus, comprising:
   a carriage for supporting an original;
   plural solid-state scanning devices so arranged as to have mutually opposing scanning directions for reading the original placed on said carriage;
   counting means for counting the numbers of pixels read respectively by said plural solid-state scanning devices until lateral edges of the original are detected; and
   detecting means for detecting the position of the original on said carriage according said counted numbers.

9. An image forming apparatus according to claim 8, wherein said counting means is adapted to count said number of pixels in the scanning direction of each of said plural solid-state scanning devices and said number of pixels in a direction perpendicular to the scanning direction.

10. An image forming apparatus according to claim 8, wherein said plural solid-state scanning devices are adapted to scan the entire area of said carriage.

11. An image forming apparatus according to claim 8, wherein said counting means is adapted to count drive signals for driving said solid-state scanning devices.

12. An image forming apparatus comprising:
    a carriage on which an original is placed;
    means for reading the original on said carriage and for producing an image signal as output, said reading means comprising at least one solid-state scanning device in relative movement relation with the original in an auxiliary scanning direction perpendicular to a main scanning direction;
    detecting means responsive to the output from said reading means for detecting an edge of the original in the main scanning direction and an edge of the original in the auxiliary direction; and
    means for identifying the size of the original placed on said carriage in accordance with the detecting result of said detecting means.

13. An image forming apparatus according to claim 16 further comprising means for displaying the identification result of said identifying means.

14. An image forming apparatus according to claim 16 wherein said detecting means detects the edges of the original by the change of the image signal from said reading means to one indicative of white and then by termination of the white indicating signal.

15. An image forming apparatus comprising:
    a carriage on which an original is placed;
    means for reading the original on said carriage and for producing an image signal as output, said reading means comprising at least one solid-state scanning device in relative movement relation with the original;
    means for counting the number of scannings of said solid-state scanning device and the number of pixels put out from said solid-state scanning device; and
    means for detecting the position of the original on said carriage based on the counted value of said counting means when said reading means reads an edge of the original.

16. An image forming apparatus according to claim 19, further comprising means for storing the counted value of said counting means.

17. An image forming apparatus according to claim 19, wherein the position detection of said detecting means is performed at the same time as the original reading of said reading means.

18. An image forming apparatus according to claim 19, wherein the counted value of said counting means is utilized to obtain the coordinates of the four edges of the original.

* * * * *

UNITED STATES PATENT AND TRADEMARK OFFICE
CERTIFICATE OF CORRECTION

PATENT NO. : 4,439,790
DATED : March 27, 1984
INVENTOR(S) : T. Yoshida

It is certified that error appears in the above-identified patent and that said Letters Patent is hereby corrected as shown below:

Column 8, lines 37 and 40 in each, "claim 16" should be --claim 12--.

lines 58, 61 and 65 in each, "claim 19" should be --claim 15--.

Signed and Sealed this

Twenty-fourth Day of September 1985

[SEAL]

Attest:

Attesting Officer

DONALD J. QUIGG

Commissioner of Patents and Trademarks—Designate